Figure 1:
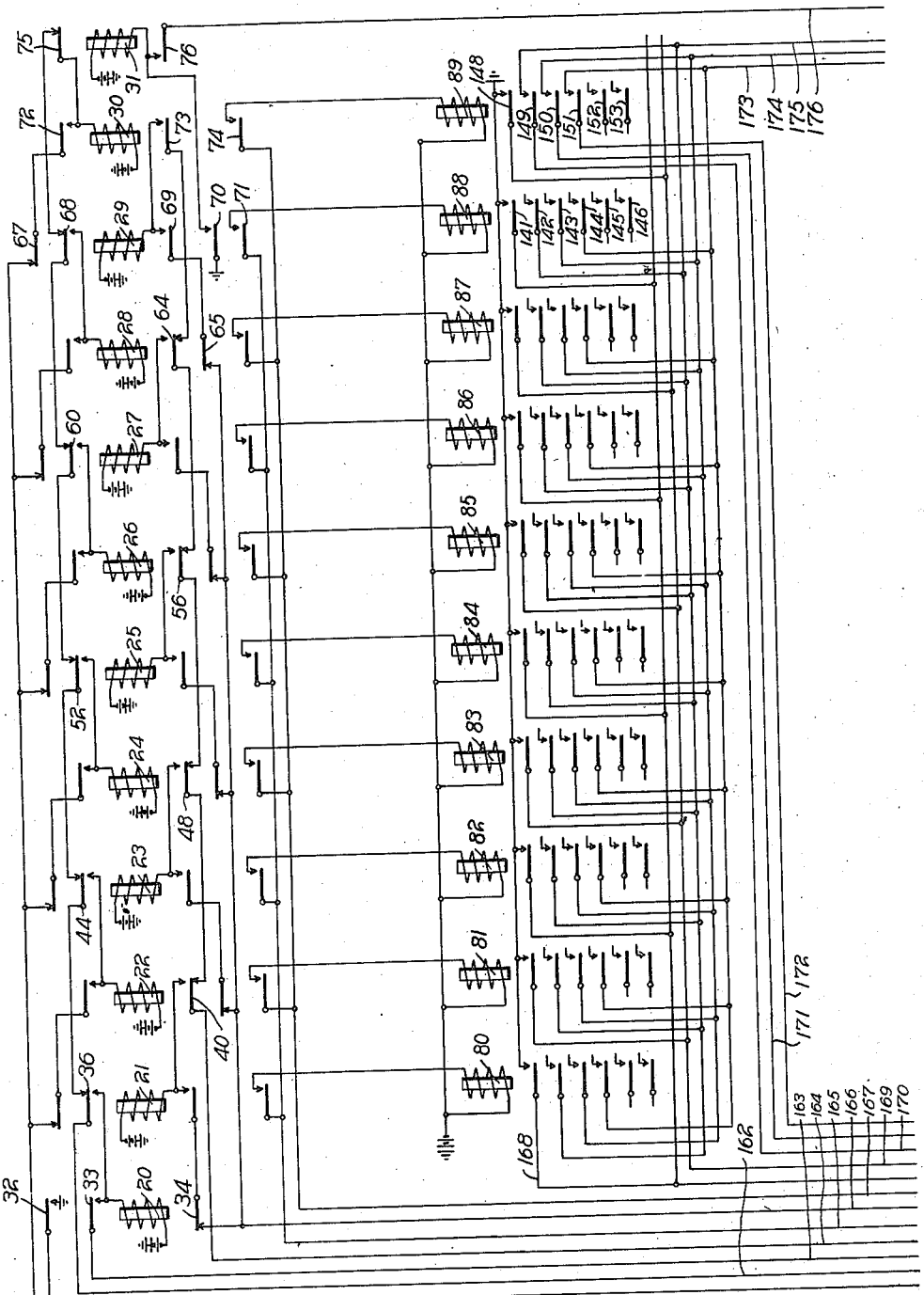

May 28, 1929.  T. U. WHITE  1,714,968
SUPERVISORY CONTROL SYSTEM
Filed March 17, 1924   8 Sheets-Sheet 1

WITNESSES:

INVENTOR
Thomas U. White
BY
ATTORNEY

May 28, 1929.                T. U. WHITE                1,714,968
                         SUPERVISORY CONTROL SYSTEM
                           Filed March 17, 1924        8 Sheets-Sheet 4

WITNESSES:

INVENTOR
Thomas U. White
BY
                ATTORNEY

May 28, 1929.　　　　T. U. WHITE　　　　1,714,968
SUPERVISORY CONTROL SYSTEM
Filed March 17, 1924　　　8 Sheets-Sheet 8

WITNESSES:
A. G. Schiefelbein
H. B. Funk

INVENTOR
Thomas U. White
BY
Wesley G. Carr
ATTORNEY

Patented May 28, 1929.

1,714,968

UNITED STATES PATENT OFFICE.

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA.

SUPERVISORY CONTROL SYSTEM.

Application filed March 17, 1924. Serial No. 699,669.

My invention relates to supervisory control systems and particularly to systems for controlling and supervising remotely-disposed electrical equipment from a central point or dispatcher's office.

One object of my invention is to provide improved circuits and apparatus whereby it is possible to supervise and control, from a dispatcher's office, at high speed, a large number of circuit breakers, or other apparatus units, in a remotely-disposed station.

Another object of my invention is to provide a selective mechanism comprising relay chains at the dispatcher's office and station, inasmuch as the relays will function much more quickly than other selective apparatus.

Another object of my invention is to provide an improved controlling circuit whereby corresponding relays in the respective chains at the dispatcher's office and at the station may be impulsed simultaneously or operate in synchronism.

Another object of my invention is to provide a "slip multiple" arrangement whereby the incorrect selection or operation of the counting relay chains is precluded if a relay fails.

Another object of my invention is to provide means whereby the current in the control circuit is caused to reverse alternately to cause the control circuit to function properly without using polarized relays.

Another object of my invention is to provide means for resetting and restarting the operation of the relay chains at both the dispatcher's office and substation in the event that the current in the control circuit does not reverse in direction within a predetermined interval of time.

A further object of my invention is to provide means for increasing the capacity of the system in a simple and economical manner.

There are other objects of the invention which, together with the above, will be described in the detailed specification which is to follow.

In the past, it has been exceedingly difficult, even in the laboratory, to make relay chains separated by some distance to operate synchronously. By my controlling circuit, it is possible to operate the relay chains in synchronism over a great distance in commercial systems without fear of failure or incorrect selective operation.

Referring now to the drawings, comprising Figs. 1 to 8, inclusive, sufficient circuits and apparatus are shown by means of the conventional circuit diagrams to enable my invention to be readily explained and understood.

The apparatus and circuits shown in Figs. 1 to 4, inclusive, are those located at the dispatcher's office, while the apparatus and circuits shown in Figs. 5 to 8, inclusive, are those located at the substation.

In practicing my invention, I provide a counting relay chain at the dispatcher's office and a counting relay chain at the substation. A group of switching relays is associated with each of the counting chains, there being one switching relay for each counting relay. The number of counting relays is determined by the number of signal and control wires that it is economical to use between the substation and office and the number of apparatus units that it is desired to supervise and control, in a manner that will be hereinafter explained.

The switching relays of each group are so connected to the relays of the counting chain by a "slip multiple" arrangement as to safeguard the selecting operations of the counting chain.

A group of double-throw keys is provided at the dispatcher's office, there being one key for each apparatus unit that it is desired to operate. A plurality of signalling lamps are also provided, two for each apparatus unit in the substation, in order that the condition of the units may be apparent to the dispatcher at all times. In addition to the above, a controlling circuit for operating the relays of the counting chains synchronously is provided at the dispatcher's office and at the substation. Sources of alternating current for supplying alternating current of different frequencies are also provided. The two controlling circuits are connected together over a single wire and a ground return. It is, of course, obvious that a complete metallic circuit may be used.

In order to actuate the supervisory signalling devices and cause the selection of the apparatus units, harmonic relays are provided at both the dispatcher's office and the substation.

Briefly, the operation proceeds as follows: when the dispatcher desires to operate an apparatus unit at the substation, he will throw, in the proper direction, the key corresponding to that unit. As a result of this operation, the control circuits in both the dispatcher's office and substation function to operate the relays of the counting chains in a predetermined sequence, the corresponding relays in each chain being operated simultaneously. When the counting relay corresponding to the operated key is energized, alternating current from one of the alternating-current generators traverses the proper signal and control conductor to actuate the apparatus unit.

The next counting relays are prevented from operating by the control circuits until the apparatus unit has been operated and a check received at the dispatcher's office. The control circuit then operates the counting relay chain until the last counting relay is operated. In the event that the control circuit does not function properly and two positive or two negative impulses of current are received at the dispatcher's office or substation, a timing device at that place will function to cause the release and the reoperation of the counting chains at both places.

When an apparatus unit operates under automatic control at the substation, the control circuits function to operate their associated counting relay chains in the same manner as before, the signalling taking place upon the actuation of each counting relay. By this means, the condition of all the apparatus units is checked each time the counting chains operate. By the change in supervisory signals at the dispatcher's office, the dispatcher is apprised of the change in condition of an apparatus unit in the substation.

Referring now more particularly to Fig. 1, relays 21 to 30, inclusive, comprise the relays of the counting chain at the dispatcher's office. Relays 20 and 31 are controlling relays for controlling some of the operations of the relays in the counting chain. Relays 80 to 89, inclusive, are switching relays for selecting the proper signalling device and sending the controlling signals to the station or substation.

Figure 2:
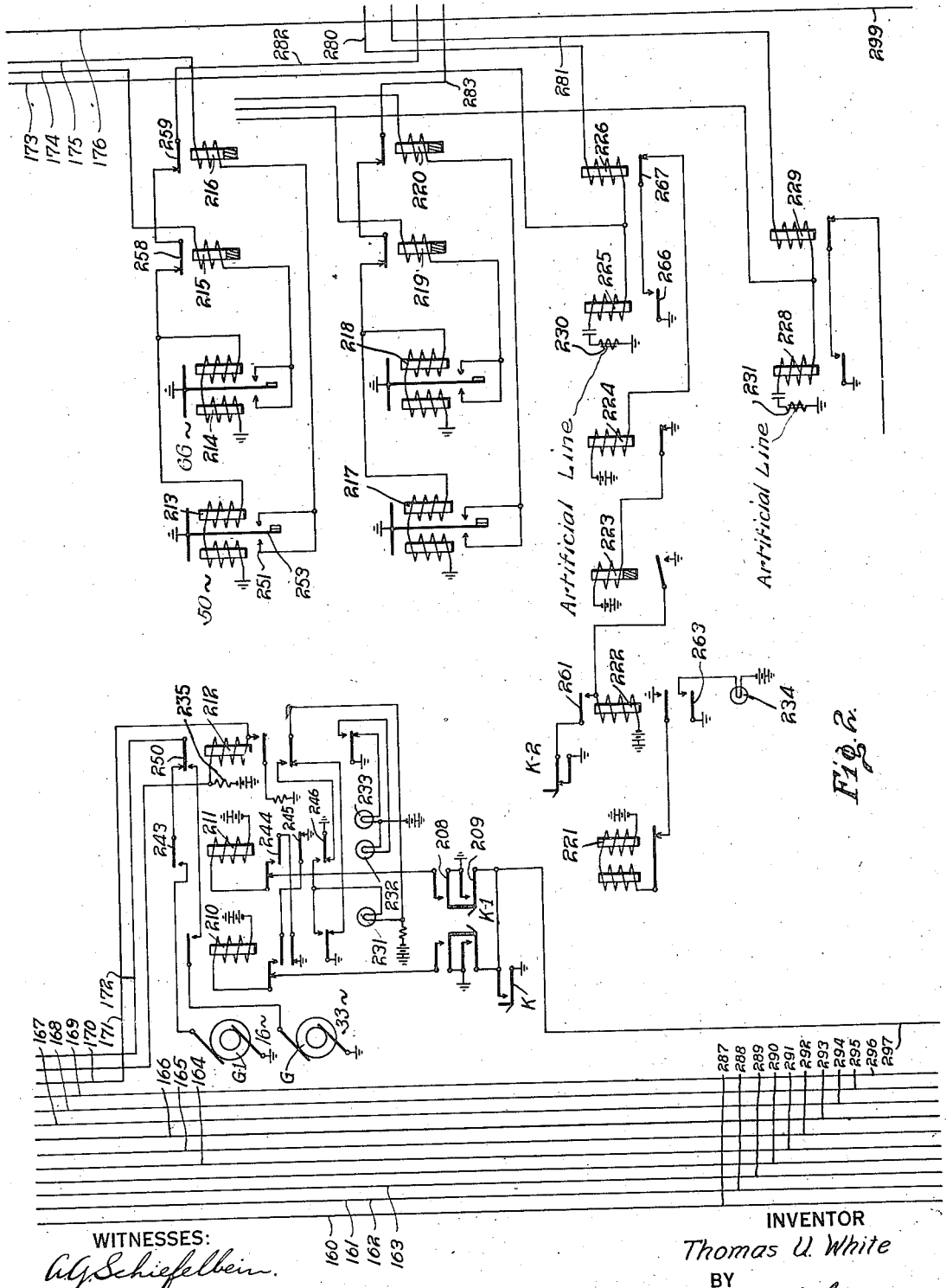

In Fig. 2, relays 210 to 212, inclusive, are associated with a key K—1 and supervisory signalling devices 232 and 233. There are three relays, such as 210 to 212, inclusive, for each key, such as K—1, or, in other words, for each apparatus unit that it is desired to control and supervise in the substation.

Harmonic relay devices 213 and 214 are tuned mechanically to respond to particular frequencies of alternating current. Relays 215 and 216 are associated with these devices and control the functioning of the signalling circuit, as will appear. Relays 217 to 220, inclusive, comprise harmonic relays and ordinary relays associated with another signalling circuit. Relays 221 to 226, inclusive, are relays associated with a control circuit. Relays 228 and 229 are a portion of the relays associated with a second control circuit.

Figure 3:
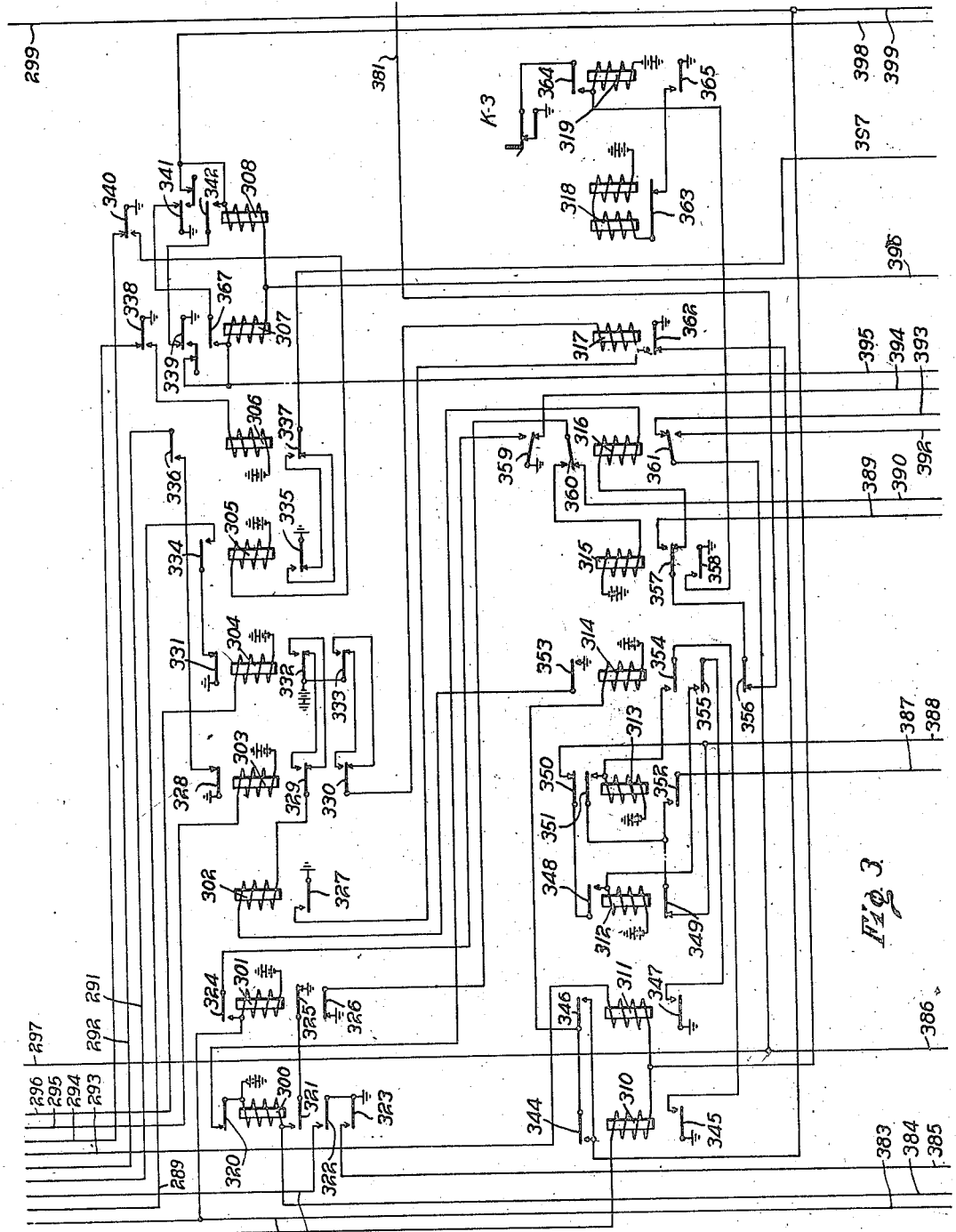
Figure 4:
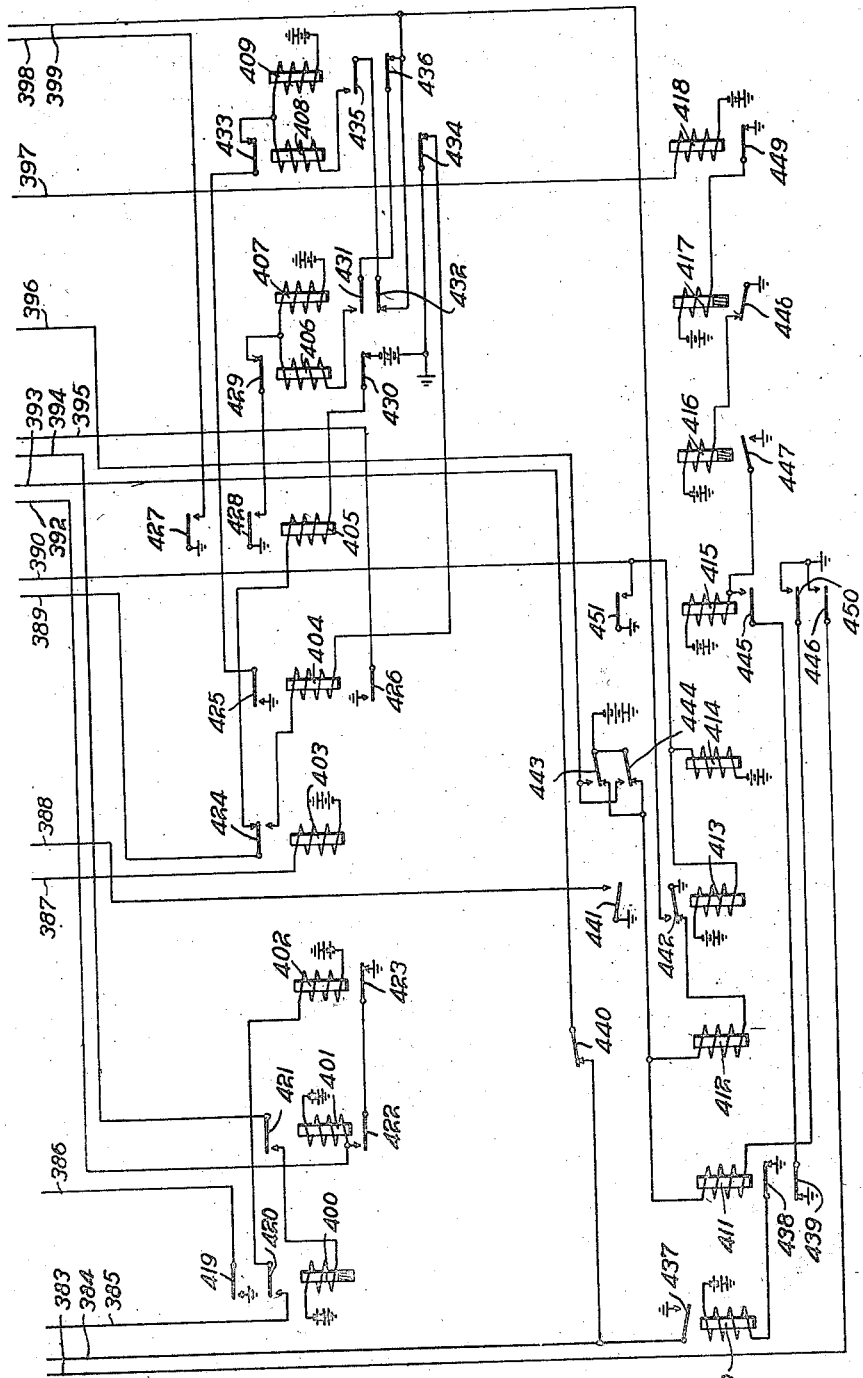

Relays 300 to 319, inclusive, of Fig. 3 and relays 400 to 418, inclusive, of Fig. 4 are controlling relays for controlling the operation of the counting and switching relays.

Figure 5:
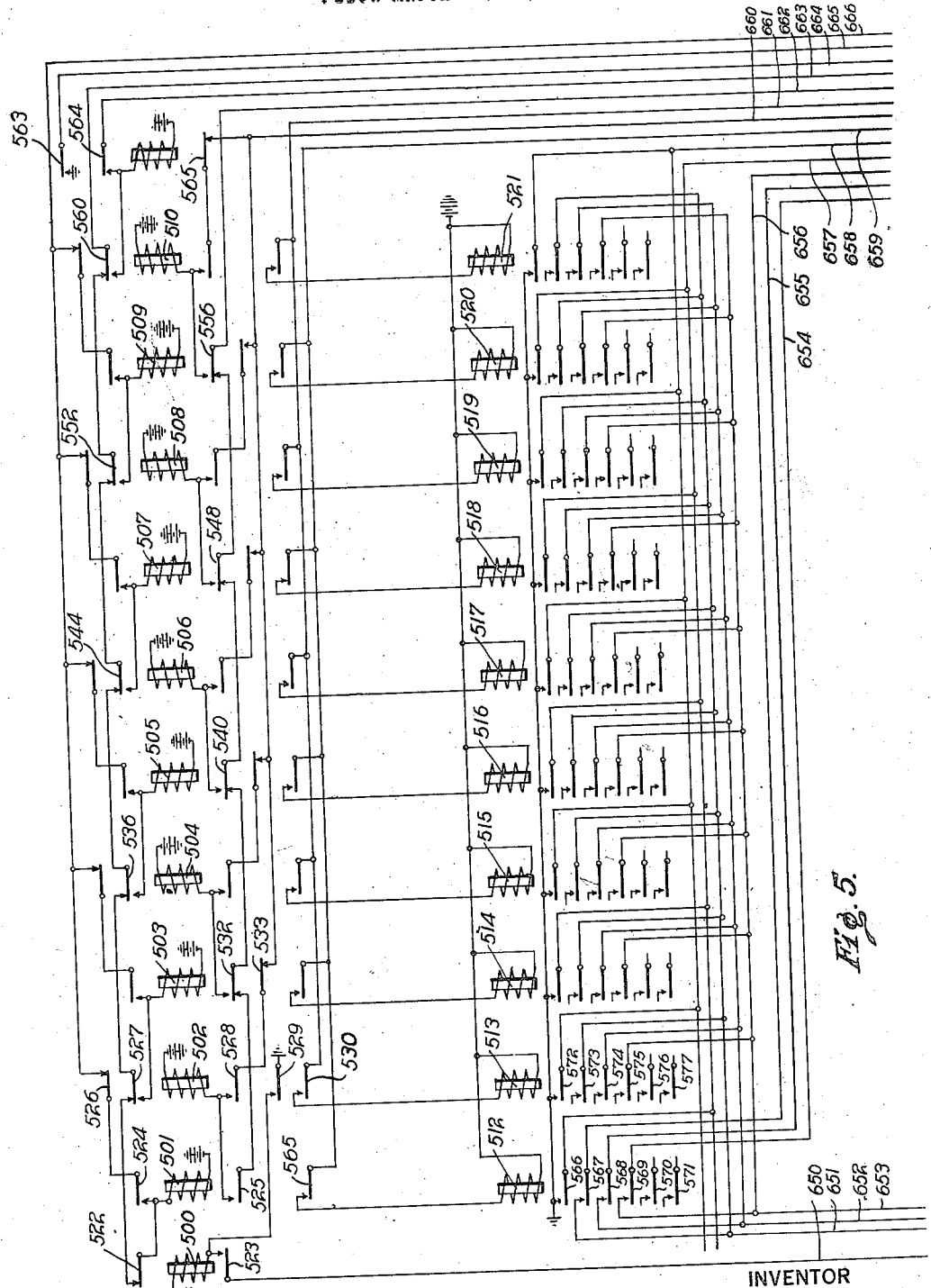

In Fig. 5, relays 501 to 510, inclusive, comprise the relays of the counting chain at the substation. Relays 500 and 511 are controlling relays and relays 512 to 521, inclusive, are the switching relays associated with the relays of the counting chain.

Figure 6:
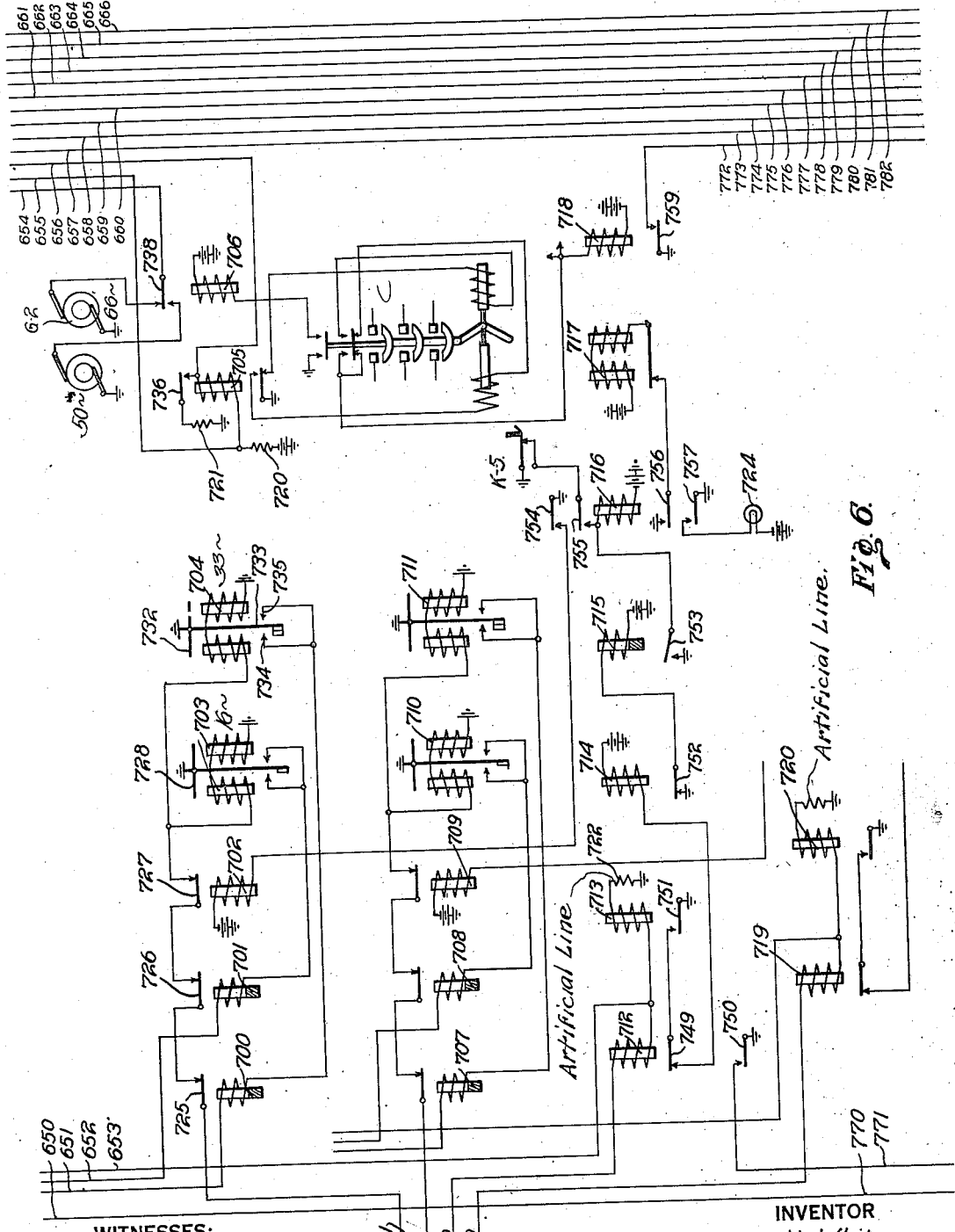

In Fig. 6, relays 700 to 704, inclusive, are associated with the first control circuit, while the relays 707 to 711, inclusive, are associated with the second control circuit. These two sets of relays comprise means for receiving signalling currents from the dispatcher's office to control the actuation of the proper apparatus unit. Relays 712 to 718, inclusive, are associated with the first signalling circuit and send signalling currents to the dispatcher's office. Relays 719 and 720 are a portion of the relays associated with the second signalling circuit.

Relays 705 and 706 control the operation of a circuit breaker C and also the sending out of signalling currents in accordance with the position of the circuit breaker. The circuit breaker C is of the usual type and may control the operation of translating devices or perform other well known functions. The generators G—1 and G—2 are devices for generating alternating currents of predetermined frequency.

Figure 7:
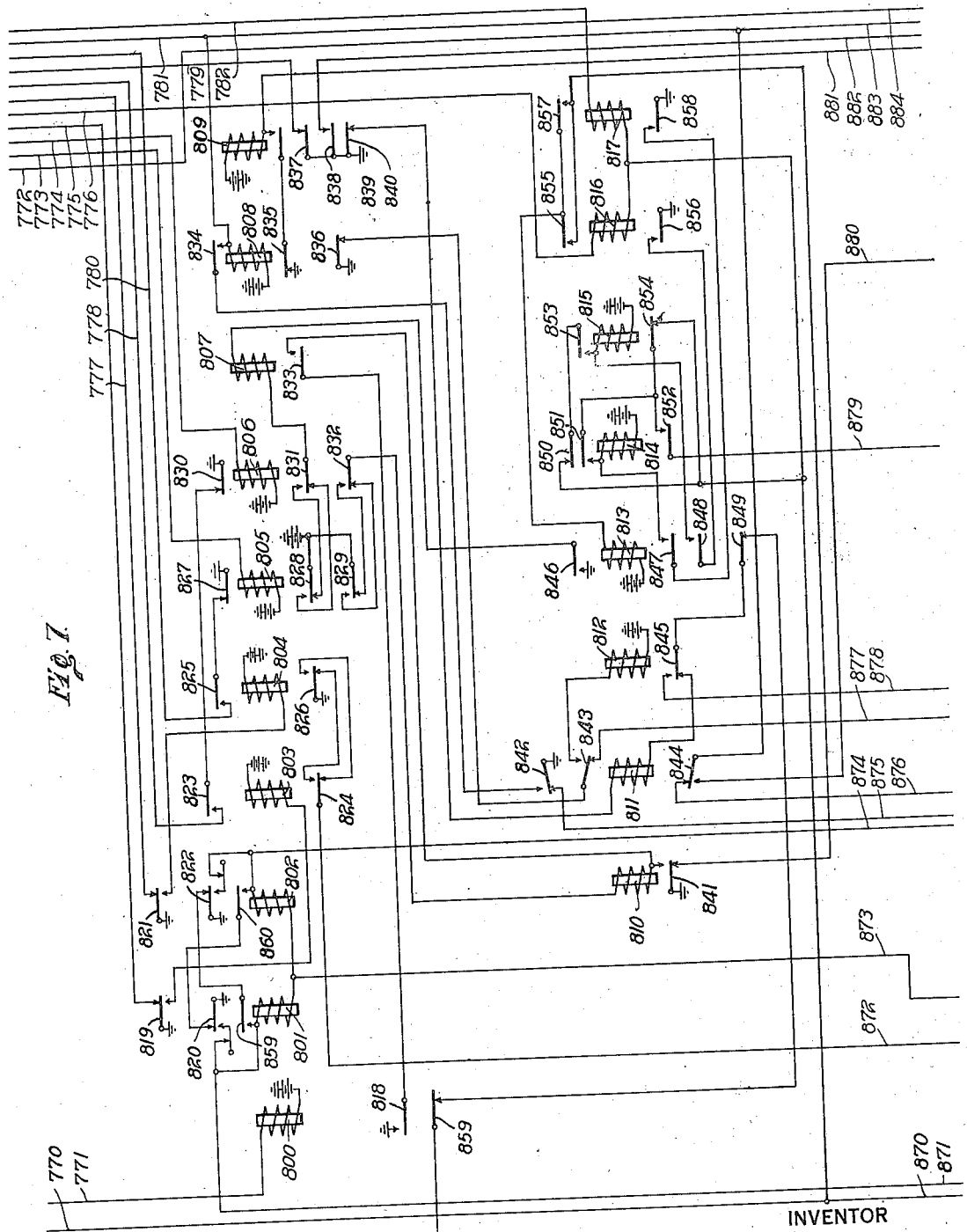
Figure 8:
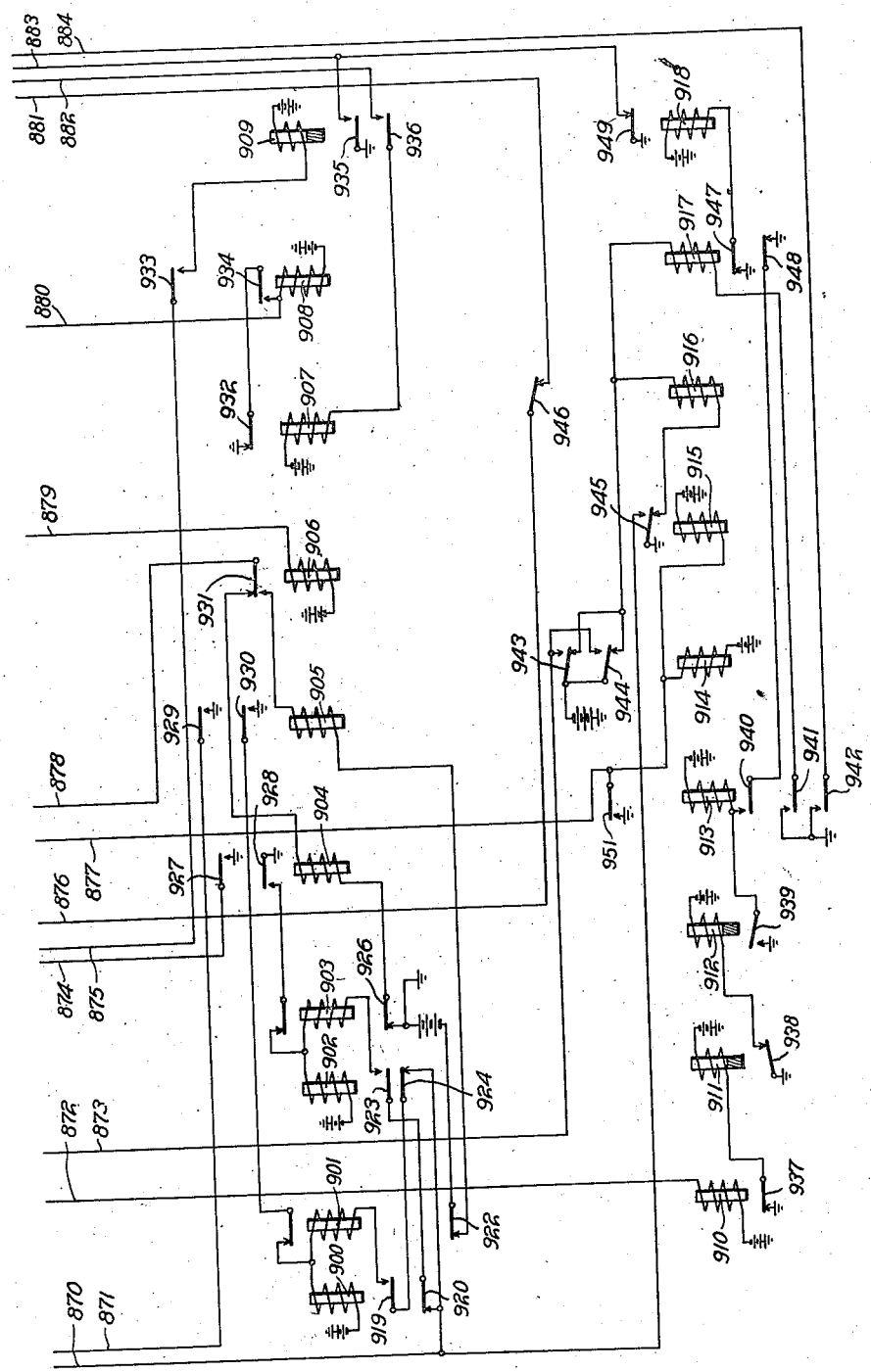

Relays 800 to 817, Fig. 7, and relays 900 to 918, inclusive, Fig. 8, are the relays that control the operation of the counting chain of relays and the switching relays of Fig. 5.

In the present case, the dispatcher's office is connected to the substation by a trunk line, comprising five conductors, two signalling conductors, two control conductors and one synchronizing conductor. In actual practice, it is probable that there will be still another conductor in order to provide a common metallic return for the circuits, instead of using ground, as shown.

Having described the apparatus shown in the drawings, I will now explain its detailed operation. For this purpose, it will be assumed that the dispatcher desires to close the circuit breaker C at the substation. In order to accomplish this result, the dispatcher will operate the key K—1 momentarily in such direction as to force the spring 208 and 209 into engagement with their working contacts.

Relay 316, at the dispatcher's office, is normally energized, as is the relay 811 at the substation. The circuit over which these relays are energized extends from battery by way of armature 320 and its back contact, winding of relay 316, back contact and armature 357, armature 356 and its back contact, trunk conductor 381, armature 859 and its back contact, back contact and armature 849, armature 845 and its back contact, winding of relay 811 and back contact and armature 840 to ground.

The relay 316 being normally energized at armature 359, opens one point in the locking circuit of the relay 301, prepares a circuit for the slow-releasing relay 400 at the front contact of this armature, prepares a circuit for the start relay 300 at armature 361, and completes a circuit at armature 360 extending from ground by way of back contact and armature 326, armature 360 and its front contact, conductor 390, and windings of relays 413 and 414 in multiple to battery.

The relay 414 is energized to prepare a circuit for the relays 411 and 412 at the armatures 443 and 444. The relay 413, upon operating, at armature 441 opens a point in the locking circuit of the relay 312 and completes a circuit at armature 442 for the relay 412. Upon being energized, the relay 412 closes another point in the circuit of the start relay 300 at armature 440.

At the substation, the relay 811 being normally energized, operates to prepare a circuit for the relay 909 at armature 842, to prepare a circuit for the start relay 809 at armature 844, and to complete a circuit at armature 843 over a path extending from ground by way of armature 836 and its back contact, armature 843 and its front contact, conductor 877, and windings of relays 914 and 915 in parallel to battery. Relay 914, upon being energized, prepares a circuit for the relays 916 and 917 at armatures 943 and 944. The relay 915, upon operating, completes a circuit for the relay 916 at armature 945 and the relay 916 operates to close another point in the circuit of the start relay 809 at armature 946.

Now, when the key K—1 is operated in such direction as to force the springs 208 and 209 into engagement with their working contacts, a circuit is completed extending from ground by way of spring 208 and its working contact, normally closed springs controlled by armature 244, and the winding of relay 211 to battery.

The relay 211 is energized over the above circuit and operates to prepare a control circuit, at armature 243, to establish a locking circuit for itself at armature 244, to open one point in the locking circuit of the relay 210 at armature 245, and to complete a circuit for the monitoring lamp 231 at armature 246.

Another result of the operation of the key K—1 is that a circuit is completed extending from ground by way of the working contact of spring 209 and said spring, conductor 297, armature 361 and its front contact, conductor 393, armature 440 and its front contact, conductor 384, and winding of relay 300 to battery.

The relay 300, upon operating, establishes a locking circuit for itself at armature 321, opens the previously traced circuit including the relays 316 and 811 at armature 320, prepares a circuit for the relay 402 at armature 323, and prepares a locking circuit for the relay 20 at armature 322. The relay 316, upon retracting its armatures, prepares a locking circuit for the relay 301 at armature 359, opens the circuit of the relays 413 and 414 at armature 360, at the back contact of this armature completes a circuit for the relay 315, and at armature 361 prepares a circuit for the relay 401, the key K—1 now being in released position.

The relay 315, upon being energized, closes a circuit at armature 358 for the relay 319 and, at armature 357, disconnects the trunk conductor 381 from the relay 316 and connects it by way of the conductor 389 to the relay 405. The relay 319, upon being operated, at armature 364 closes a locking circuit for itself and completes a circuit for the buzzer 318 at armature 365. The buzzer immediately begins to vibrate its armature 363, thus creating a tone which draws the attention of the dispatcher and apprises him that the apparatus is about to function.

When the circuits of the relays 413 and 414 are opened, as above described, these relays are deenergized. The relay 414, upon retracting its armatures 443 and 444, places battery upon the battery supply conductor 396 and opens the circuit of the relay 412. The relay 413 closes one point in the locking circuit of the relay 312 at armature 441, at armature 442 opens another point in the circuit of the relay 412, and at the back contact of this armature places ground upon the ground supply conductor 399. The relay 412 retracts its armature 440 to open one point in the circuit of the relay 300. However, as the locking circuit of the relay 300 has been previously established, this operation is without particular effect at the present time.

At the substation, the relay 811, upon retracting its armatures, prepares a locking circuit for the relay 808 at armature 842, opens the circuit of the relays 914 and 915 at armature 843, at the back contact of this armature completes a circuit for the relay 812, opens one point in the starting circuit at armature 844, and at the back contact of this armature prepares another starting circuit. The relay 812, upon being energized, disconnects the winding of the relay 811 from the trunk conductor 381, and at the front contact of this armature connects the winding of the relay 904 thereto.

When the circuit of the relays 914 and 915 is opened, these relays are deenergized. The relay 914 retracts its armatures 943 and 944 to open the circuit of the relay 916 and to place battery upon the battery supply conductor 873. The relay 915 retracts its armature 945 to open one point in the circuit of the relay 916 and to place ground upon the ground supply conductor 870.

By the deenergization of the relays 316 and 811, a circuit is completed extending from ground by way of back contact and armature 926, winding of relay 904, back contact and armature 931, conductor 878, front contact and armature 845, armature 849 and its back contact, back contact and armature 859, trunk conductor 381, back contact and armature 356, armature 357 and its front contact, conductor 389, armature 424 and its back contact, winding of relay 405, and armature 430 and its back contact to battery. The relays 405 and 904 are energized over the above circuit.

The relay 405, upon operating, completes a circuit for the relay 407 at armature 428, and at armature 427 completes a circuit extending from ground by way of said armature and its front contact, conductor 398, winding of relay 308, and to the battery supply conductor 396. The relay 407, upon operating, prepares a circuit at armature 431 for the relays 406 and 407 and opens one point in the circuit of the relays 408 and 409 at armature 432. The relay 406 is not energized at this time for the reason that it is short-circuited by the energizing circuit for the relay 407.

The relay 308, at armature 341, opens one point in the locking circuit of the relay 307, at the front contact of this armature sends an impulse of current through its winding, establishes a locking circuit for itself at armature 342 and completes a circuit for the relay 305 at armature 340. The relay 305, upon operating, completes a circuit at armature 335 extending from ground by way of said armature and its front contact, back contact and armature 337, conductor 397, and winding of relay 418 to battery. The relay 418 operates, at armature 449, to open the circuit of the slow-releasing relay 417.

Another result of the operation of the relay 305 is that a circuit is completed at armature 334 extending from ground by way of armature 331 and its back contact, armature 334 and its front contact, conductor 289, conductor 162, armature 36 and its back contact, armature 44 and its back contact, armature 52 and its back contact, armature 60 and its back contact, armature 68 and its back contact, back contact and armature 75, and winding of the first counting relay 30 to battery.

The relay 30, upon being energized, establishes a locking circuit to be traced later for itself at armature 72, prepares a circuit for the relay 29 at armature 73, and at armature 74 completes a circuit extending from ground by way of armature 338 and its back contact, conductor 294, conductor 167, armature 74 and its front contact, and winding of switching relay 89 to battery.

The switching relay 89 operates to prepare certain control and signalling circuits, that will be described hereinafter, at armatures 149 to 153, inclusive, and completes a circuit at armature 148 extending from ground by way of front contact and said armature, conductor 169, conductor 296, and winding of relay 304 to battery. The relay 304 is energized over the above circuit and operates to open the original energizing circuit of the counting relay 30 at armature 331, prepares a circuit for the relay 302 at armature 332, and at armature 333 prepares a circuit for the relay 317.

The locking circuit of the counting relay 30 extends from ground by way of armature 442 and its back contact, conductor 399, winding of the relay 310, conductor 287, conductor 160, back contact and armature 67, armature 72 and its front contact, and winding of relay 30 to battery.

The relay 310 remains short-circuited until the relay 30 is energized, as the original energizing circuit of this counting relay is effective until that time. When the relay 310 operates, it prepares a circuit at armature 345 for the relay 313, and at armature 344 establishes a circuit for the relay 314 over a path extending from ground by way of armature 362 and its back contact, front contact and armature 344, and winding of relay 314 to battery.

The relay 314, upon being energized, completes a circuit for the relay 302 at armature 353, completes a circuit for the relay 313 at armature 354, at armature 355 prepares a circuit for the relay 312, and at armature 356 opens the circuit of the relay 405 and also the circuit of the relay 904. The relay 302, upon being energized, completes a circuit extending from ground by way of armature 327 and its front contact, relay 317, armature 330 and its back contact, front contact and armature 333 and to battery.

The relay 313, upon operating, opens one point in the locking circuit of the relay 312 at armature 350, and at armature 351 establishes a locking circuit for itself over a path extending from ground by way of armature 441 and its back contact, conductor 388, back contact and armature 349, armature 351 and its front contact, and winding of relay 313 to battery.

Another result of the operation of the relay 313 is that a circuit is completed extending from ground by way of armature 345 and its front contact, armature 354 and its front contact, front contact and armature 351, front contact and armature 352, conductor 387, and winding of relay 403 to battery. The previously traced locking circuit for the relay 313 also extends to the winding of the relay 403 and this relay is maintained energized in multiple with the relay 313.

The relay 317, upon being operated, establishes a locking circuit for itself at armature 362, and at the back contact of this armature opens the circuit of the relay 314. The relay 314 is immediately deenergized and operates to open the original energizing circuit of the relay 313 at armature 354, and at armature 356 closes one point in the trunk circuit. Another result of the deenergization of the relay 314 is that the circuit of the relay 302 is opened and this relay is deenergized to open the original energizing circuit of the relay 317. The relay 317 does not deenergize at this time by reason of the fact that a locking circuit has been completed for it at armature 362.

The relay 403, upon operating, at armature 424 disconnects the trunk conductor 381 from battery through the relay 405 and connects it to ground through the winding of the realy 404. As the circuit of the relay 405 is opened, by the operation of the armature 356 of the relay 314, this relay is deenergized to open the original energizing circuit of the relay 308 at armature 427, and to remove the short-circuit from the relay 406 at armature 428. The former operation is without particular effect at the present time by reason of the fact that a locking circuit has been established for the relay 308.

The removal of the short-circuit from the relay 406 permits this relay to be energized in series with the relay 407, whereupon, by the armature 430, battery is disconnected from one terminal of the relay 405.

During this time interval, at the substation, the following operations occur. The relay 904, upon being energized operates to complete a circuit for the relay 902 at armature 928, and at armature 927 completes a circuit extending from ground by way of front contact and said armature, conductor 874, winding of relay 802, and thence to battery by way of battery supply conductor 873. The relay 902, upon being energized, at armature 923 completes a circuit extending from ground by way of armature 945 and its back contact, back contact and armature 920, armature 923 and its front contact, winding of relay 903, and winding of relay 902 to battery. This circuit is not effective as long as the relay 904 remains energized. Another result of the operation of the relay 902 is that one point in the locking circuit of the relay 901 is opened at armature 924.

The relay 802 is energized over the above circuit and operates to open one point in the locking circuit of the relay 801 at armature 822, to momentarily establish a locking circuit for itself at the front contact of this armature, to complete a locking circuit for itself at armature 860, and to complete a circuit for the relay 804 at armature 821. The relay 804, upon being energized, completes a circuit extending from ground by way of armature 826 and its front contact, back contact and armature 824, conductor 872, and winding of relay 910 to battery. The relay 910 immediately operates to open the circuit of the slow-releasing relay 911 at armature 937. Another result of the operation of the relay 804 is that a circuit is completed extending from ground by way of armature 827 and its back contact, armature 825 and its front contact, conductor 780, conductor 664, armature 560 and its back contact, armature 552 and its back contact, armature 544 and its back contact, armature 536 and its back contact, armature 527 and its back contact, back contact and armature 522, and winding of first counting relay 501 to battery.

The relay 501 is energized over the above circuit and operates to establish a locking circuit to be traced later for itself at armature 524, to prepare a circuit for the second counting relay 502 at armature 525, and at armature 565 to complete a circuit extending from ground by way of armature 819 and its back contact, conductor 775, conductor 659, armature 565 and its front contact, and winding of relay 512 to battery. The relay 512 is energized over the above circuit and operates, at armature 566, to complete a circuit extending from ground by way of front contact and said armature, conductor 657, conductor 773, and winding of relay 805 to battery. The relay 805 is energized over the above circuit to open the original energizing circuit of the first counting relay 501 and to prepare circuits for the relays 810 and 807 at armatures 828 and 829, respectively.

The previously mentioned locking circuit of the first counting relay 501 extends from ground by way of armature 945 and its back contact, conductor 870, winding of relay 817, conductor 782, conductor 666, back contact and armature 526, armature 524 and its front contact, and winding of relay 501 to battery. The above traced locking circuit is ineffective to energize relay 817 until the operation of the relay 805, by reason of the fact that, as long as the original energizing circuit remains closed, the relay 817 is short-circuited.

When the relay 805 is energized, the short-circuit is removed from the winding of relay 317 and this relay is operative. As a result of this operation, a circuit is completed extending from ground by way of armature 841 and its back contact, front contact and armature 857, and winding of relay 813 to battery.

The relay 813 operates, at armature 849, to disconnect the trunk conductor 381 from the winding of relay 904 and to complete a circuit for the relay 814 over a path extending from ground by way of armature 858 and its front contact, armature 847 and its front contact, and winding of relay 814 to battery. Another result of the operation of the relay 813 is that a circuit is completed extending from ground by way of armature 846 and its front contact, winding of relay 807 and front contact and armature 828 to battery. The relay 807 operates to prepare a circuit for the relay 810.

The relay 814, upon being energized, opens one point in the locking circuit of the relay 815 at armature 850 and establishes a locking circuit for itself, at armature 851, over a path extending from ground by way of armature 945 and its back contact, conductor 870, back contact and armature 854, armature 851 and its front contact, and winding of relay 814 to battery. Another circuit is completed by the operation of the relay 814, which extends from ground by way of armature 858 and its front contact, armature 847 and its front contact, front contact and armature 851, front contact and armature 852, conductor 879, and winding of relay 906 to battery. When the armature 852 is operated, the circuit for the relay 906 also extends to the ground conductor 870.

With the switching relays 89 and 512 energized, at the dispatcher's office and substation, respectively, as before described, there is a signalling circuit completed to signal the position of the circuit breaker C. This circuit extends from the ungrounded pole of the generator G—2, which, for example, is a 50 cycle generator, at the substation by way of back contact and armature 738, conductor 654, armature 569 and its front contact, conductor 653, winding of alternating-current relay 712, conductor 282, armature 259 and its back contact, armature 258 and its back contact and winding of harmonic relays 213 and 214 to ground. As the armature 253 of the harmonic relay 213 is tuned to respond to alternating current of a frequency of 50 cycles this relay is operated and a circuit is closed extending from ground by way of contact-making member 253, contact 251, winding of slow-to-release relay 216, conductor 175, front contact and armature 149, conductor 171, and winding of resistor 235 to battery. This circuit is without particular function at this time inasmuch as the relay 212 is already deenergized. The relay 216, however, is energized over the above circuit and serves to disconnect the harmonic relays 213 and 214 from the trunk conductor 282.

When, however, the relay 212 is energized due to the fact that the supervisory lamp does not agree with the power mechanism, this circuit will short-circuit the relay. The locking-circuit of the relay will be opened, and the supervisory lamp 233 which was lit will be extinguished, and the lamp 233 will receive energy instead.

At the substation, the relay 712 is connected in series with the signalling circuit. The relay 712, upon being energized, opens one point in the circuit of the relay 714 at armature 749, and at armature 750 completes a circuit extending from ground by way of said armature and its front contact, conductor 771 and winding of relay 800 to battery.

The relay 713 is also connected in parallel with the above signalling circuit. It will be seen that the circuit of the relay 713 extends through the artificial line 722 to ground. The impedance of this artificial line corresponds to the impedance of the signalling circuit extending to the dispatcher's office. Thus, the relay 713 will be energized substantially the same period of time as the relay 712.

In the event that the relay 712 does not operate for any reason, such as the signalling conductor 282 being open, a circuit is completed extending from ground by way of armature 751 and its front contact, armature 749 and its back contact and winding of relay 714 to battery. The relay 714 operates to open the circuit of the slow-releasing relay 715. The relay 715 retracts its armature 753 to close the circuit of the relay 716. The relay 716, upon being energized, establishes a locking circuit for itself at armature 755, completes a circuit for the relay 702 at armature 754, completes a circuit for the buzzer 717 at armature 756 and at armature 757 completes a circuit for the lamp 724. The operation of the relay 702 so opens the controlling circuit of the harmonic relays 703 and 704 that no operation may be performed at the substation. When the trouble is cleared, the circuit may be restored to normal by the operation of the key K—5. Normally, however, during operation of the signalling while relay 712 is deenergized when relay 713 is energized, the circuit for the relay 715 is not open long enough to give its armature time to close its back contact, relay 715 being slow to release.

When the relay 800 operates over the above described circuit, the line circuit is opened at armature 859 and a circuit is completed at armature 818 extending from ground by way of front contact and said armature, armature 833 and its front contact winding of relay 810 armature 832 and its back contact, armature 829 and front contact to battery. The relay 810, upon being energized, establishes a locking circuit for itself at armature 841, and at the back contact of this armature opens the circuit of the relay 813. The relay 813 retracts its armatures to reestablish a point in the circuit of the trunk conductor 381 at armature 349, to open the original energizing circuit of the relay 814 at armature 847, and at armature 846 to open the circuit of the relay 807. The relay 807 is deenergized to open the original energizing circuit of the relay 810. By reason of their locking circuits, the relays 810 and 814 are maintained energized.

The relay 906, upon being energized over the previously traced circuit, disconnects the ground through the winding of the relay 904 from the trunk conductor 381 and connects battery thereto through the winding of the relay 905. The deenergization of the relay 904 permits the relay 903 to operate. The relay 903 operates to disconnect ground from the winding of the relay 904 at armature 926.

A control circuit is completed by the operation of the switching relays 89 and 512, at the dispatcher's office and substation, respectively, which extends from the ungrounded pole of the alternating-current generator G, that generates an alternating current having a frequency of 50 cycles, by way of front contact and armature 243, back contact and armature 250, conductor 172, armature 151 and its front contact, conductor 173, winding of alternating-current relay 226, trunk conductor 280, armature 725 and its back contact, armature 726 and its back contact, armature 727 and its back contact, and windings of harmonic relays 703 and 704.

As the armature 728 of the relay 703 is tuned to respond only to alternating current having a frequency of 66 cycles, this relay does not operate. The armature 730 of the harmonic relay 704 is adjusted to respond to alternating current having a frequency of 50 cycles, and thus responds to the current applied.

The relay 704, when energized, vibrates its armature 732, thereby alternately causing the contact-making member 733 to engage the contacts 734 and 735, thus sending current impulses over a circuit extending from ground, contact-making member 733, contact 734, winding of relay 700, conductor 651, front contact and armature 567, conductor 656, winding of relay 705, and resistor 720 to battery. The relay 705 is energized over the above circuit and operates to establish a locking circuit for itself at armature 736 and to complete a circuit for the closing coil of the circuit breaker C at armature 737 in series with the common low resistance relay 718. The circuit breaker C may operate to perform any desired function at the station or substation, such as the starting of a converter or tying feeder circuits together.

At the dispatcher's office, the relay 226 is connected in series with the relay 704. Upon operating, the relay 226 opens one point in the circuit of the relay 224 at armature 267.

The alternating current that flows over the conductor 280 also flows through the winding of the relay 225 and through the artificial line 230 to ground. The impedance of the artificial line is so adjusted as to correspond to the impedance of the signalling circuit including the relay 226 and the harmonic relays 703 and 704, as well as the trunk conductor 280. Thus, the relay 226 will be energized in substantially the same time as the relay 225.

In the event that the control conductor is open circuited, the relay 226 will not be operated and the relay 224 will be energized. As a result of the operation of the relay 224, the circuit of the relay 223 is opened and this relay is deenergized after an interval of time to close the circuit of the relay 222. The latter relay operates to complete a circuit for the buzzer 221 at armature 262, to close a circuit for the alarm lamp 234 at armature 263, and to establish a locking circuit for itself at armature 261. The attention of the dispatcher is thus called to the defect and, after the same is remedied, he may restore the circuit to normal by depressing the key K—2, whereby the relay 222 is deenergized.

When the relay 705 is energized to operate the circuit breaker C, as described before, the relay 700 is also energized and this relay operates, at armature 725, to open the circuit of the harmonic relay 704 and also the circuit of the alternating-current relay 226. The latter relay thus deenergizes.

At the substation, when the circuit breaker C is operated, the relay 718 is energized momentarily in series with the closing coil. As a result of the operation of the relay 718, a circuit is completed extending from ground by way of armature 759 and its front contact, conductor 772, armature 844 and its back contact, conductor 880, and winding of relay 908 to battery. The relay 908 is immediately operated to establish a locking circuit for itself and to prepare a circuit for the slow-releasing relay 909.

The trunk circuit is now completed extending from ground by way of armature 434 and its back contact, winding of relay 404, front contact and armature 424, conductor 389, front contact and armature 357, armature 356 and its back contact, conductor 381, armature 859 and its back contact, back contact and armature 849, armature 845 and its front contact, conductor 878, armature 931 and its front contact, winding of relay 905, and back contact and armature 922 to battery. The relays 404 and 905 are energized over the above circuit.

The relay 404, upon being energized, completes a circuit for the relay 409 at armature 425, and at armature 426 establishes a circuit which extends from ground by way of front contact and said armature, conductor 395, winding of relay 307, conductor 396, and back contact and armature 443 to battery.

The relay 409, upon being operated, opens the circuit for the relays 406 and 407 at armature 436, and at armature 435 prepares a circuit for the relay 408. When the relays 406 and 407 deenergize, a circuit is prepared for the relay 407, and a circuit is completed extending from ground by way of armature 442 and its back contact, back contact and armature 432, armature 435 and its front contact, winding of relay 408, and winding of relay 409 to battery. The relay 408 is not energized over this circuit, however, by reason of the fact that it is short-circuited as long as the original energizing circuit of the relay 409 is completed.

The relay 307, upon being operated, opens the locking circuit of the relay 308 at armature 339, at the front contact of this armature sends a momentary ground impulse through its winding, completes a circuit for the relay 306 at armature 338, at the back contact of this armature opens the circuit of the switching relay 89, and at armature 367 prepares a locking circuit for itself. The relay 308 deenergizes to complete the locking circuit of the relay 307, at armature 341, to open the circuit of the relay 305 at armature 340, and to prepare a circuit for the switching relay 88 at the back contact of this armature.

The energization of the relay 306 opens one point in the circuit of the relay 418 at armature 337, and at the front contact of this armature prepares another circuit for the said relay. Another result of the operation of the relay 306 is that a circuit is completed for the second counting relay 29 at armature 336.

The deenergization of the relay 89 occurs immediately after its circuit is opened by the energization of the relay 307. The retraction of the armatures of this relay opens other points in the signalling circuit and also opens the circuit of the relay 304. The relay 304 retracts its armatures to prepare circuits for the third counting relay 28 and for the relays 302 and 317 at armatures 331, 332 and 333, respectively. The deenergization of the relay 305 also completes a circuit for the relay 418.

The momentary deenergization of the relay 418 again energizes the slow-to-release relay 417 and this relay operates to complete the circuit of the slow-to-release relay 416. When the relay 418 is again energized, the circuit of the slow-to-release relay 417 is again opened.

The relays 418, 417, 416 and 415 constitute a timing and a restart circuit that functions only in the event that the impulsing circuits do not operate at the proper speed, or that the current flow in the impulsing circuit flows in the same direction for too long an interval of time, or does not reverse, upon successive impulses. These conditions may be brought about by improper functioning of the impulsing circuits themselves and also by inductive disturbances, the latter being of much more frequent occurrence than the former.

It will be seen that, if the relay 307 is not energized for some time after the operation of the relay 308, the relay 418 remains operated during this interval of time, and, if sufficient time elapses, a circuit is completed for the relay 415. The relay 415 immediately operates to close a locking circuit for itself at armature 445, to prepare a circuit for the relay 411 at armature 450, to close a circuit for the relays 414 and 413 at armature 451, and to complete a circuit extending from ground by way of front contact and armature 446, conductor 383, and winding of relay 301 to battery. The relay 301 is energized over this circuit and operates to establish a locking circuit for itself at armature 324, to open the locking circuit of the relay 300 at armature 325, and to open the circuit of the relay 315 at armature 326.

The relay 315 deenergizes to prepare one point in the circuit of the relay 316 at armature 357, and at armature 358 opens the original energizing circuit of the relay 319. In addition, the retraction of the armature 357 of the relay 315 opens the circuit of the relay 404 or 405, as the case may be. The relay 300 retracts its armatures to restore certain locking circuits to normal at armatures 322 and 323 and, at armature 320, to prepare another point in the circuit of the relay 316.

In the meanwhile, at the substation, the relay 910 will be continuously energized and relays 911 and 912 will be deenergized. As a result of this operation, the relay 913 is operated to establish a locking circuit for itself at armature 940, to prepare a circuit for the relay 917 at armature 941, and to complete a circuit extending from ground by way of front contact and armature 942, conductor 884, and winding of relay 808 to battery. The relay 808 immediately operates to establish a locking circuit for itself at armature 834, to open the locking circuit of the relay 809 at armature 835, and at armature 836 to open the circuit of the relay 812. The relay 809 is deenergized to remove ground from the locking circuits of relays 907 and 511 at armatures 838 and 837, and at armature 840 to prepare a circuit for the relay 811.

When the relay 809 is deenergized by reason of its circuit being opened by the energization of the relay 808 and the second deenergization of the relay 300, the circuit of the relays 316 and 811 is closed and these relays are connected in series. The relay 316, upon being operated, at armature 359 opens the locking circuit of the relay 301, at the front contact of this armature prepares a circuit for the relay 400, and at armature 360 prepares a circuit for the relays 413 and 414.

The operation of the relay 415 closes, at armature 451, a circuit for the relays 413 and 414, and prepares a circuit for relay 411 as previously described. The relay 414, upon being operated, disconnects battery from the winding of relays 307 and 308 at armatures 343 and 344, and at the front contacts of these armatures, prepares a circuit for the relay 412 and completes a circuit for the relay 411. The relay 308, upon deenergizing, opens the circuit of the relay 305 at armature 340, thereby permitting this relay to deenergize.

The relay 305 is deenergized to open the circuit of the timing relay 418, at armature 335 thereby permitting this relay to be deenergized. The relay 418 completes a circuit for the relay 417. The relay 417 energizes to complete a circuit for the relay 416. The relay 416 attracts its armature 447 to open the original energizing circuit for the relay 415. The relay 413, upon being energized, at armature 442 removes ground from the conductor 399. As a result of the removal of ground from this conductor, the locking circuit of the relay 310 and of the counting relay 30 is opened and these relays are deenergized. The deenergization of the relay 30 opens the circuit of the switching relay 89 and this relay is deenergized to open the circuit of the relay 304. This relay is deenergized to establish the circuit of the relay 317.

By the removal of ground from the conductor 399, the circuits of the relays 406 and 407 are opened since the circuit for these relays in series is completed over armatures 431 and 436, line 399, armature 442 to ground and these relays are deenergized. The operation of the armature 441 also removes ground from the locking circuit of the relay 313, thereby permitting this relay to deenergize. Another result of the operation of the relay 413 is that, at the front contact of armature 442, a circuit is completed for the relay 412. The relay 412 operates to prepare a point in the starting circuit.

The energization of the relay 411 opens the locking circuit of the relay 415 at armature 439, and opens the circuit of the relay 410 at armature 438. The relay 410 is deenergized to place ground upon the conductor 384, thereby completing a circuit for the relay 300. The relay 300 is operated to prepare a locking circuit for itself at armature 321, and to open the circuit of the relays 316 and 811 at armature 320.

The relay 415 is deenergized when its locking circuit is opened and opens the circuits of the relays 413 and 414, and also the circuit of the relay 301. The deenergization of the relays 413 and 414 opens the circuit of the relay 412 and prepares certain circuits. The relay 301 is deenergized to establish a locking circuit for the relay 300 at armature 325 and to complete a circuit at armature 326 for the relay 315. The relay 411, upon being deenergized, completes a circuit for the relay 410, and this relay is operated to open the original energizing circuit of the relay 300.

At the substation, the energization of the relay 913 completes a circuit for the relays 914 and 915 at armature 951. The relay 914, upon being energized, opens the circuit of the relay 802 and permits this relay to deenergize, thereby opening the circuit of the relay 804. The relay 804 deenergizes to open the circuit of the relay 910. The relay 910 deenergizes to complete the circuit of the relay 911 which operates to close the circuit of the relay 912. The latter relay is operated to open the original energizing circuit of the relay 913.

Another result of the operation of the relay 913 is that a circuit is completed at armature 951 for the relay 915. The relay 915 operates to complete a circuit for the relay 916 and to open the locking circuit of the first counting relay 501 in series with the relay 817. The counting relay 501 deenergizes to open the circuit of the relay 512. The latter relay is deenergized to open the circuit of the relay 805. The relay 805 retracts its armatures to open the circuit of the relay 807 which is deenergized.

When the relay 914 is energized, as before described, a circuit is completed for the relay 917 and this relay operates to open the locking circuit of the relay 913 at armature 948 and to open the circuit of the relay 918 at armature 947. The relay 918 is deenergized to complete a circuit extending from ground by way of armature 949 and its back contact, conductor 883, armature 844 and its front contact, conductor 876, armature 946 and its front contact, conductor 881, and winding of relay 809 to battery. The relay 809 is energized and operates to prepare a locking circuit for itself at armature 837 and to open one point in the circuit of the relays 811 and 316 at armature 840.

When the locking circuit of the relay 913 is opened, this relay is deenergized to open the circuits of the relays 914 and 915, as well as the circuit of the relay 917. The relay 913 also opens the original energizing circuit of the relay 808 at 942, thereby permitting this relay to deenergize to prepare a circuit for the relay 809 and to prepare a circuit for the relay 812. The relay 914, upon being deenergized, prepares certain circuits at armatures 943 and 944 and opens the circuit of the relay 916. This relay is deenergized to open the original energizing circuit of the relay 809. The relay 917 is deenergized to complete a circuit for the relay 918 and the relay 918 is energized to open one point in the energizing circuit of the relay 809.

In this manner, the apparatus at the dispatcher's office and station, or substation, is released upon the operation of the timing circuits. By the deenergization of the relays 316 and 811, the circuits start to function from the first in the same manner as before described.

The above described operation of the timing circuit may occur between any two impulses of current, regardless of what counting relays are operated, that is, the timing circuit does not permit the control circuit to become inoperative indefinitely.

It will be noted that, in case inductive interference causes the energization of one of the relays 404 or 405 or 904 or 905, and not the operation of the corresponding relay at the opposite end, one timing circuit will function and the functioning of this timing circuit will restore the apparatus at both the dispatcher's office and substation to normal and cause its reoperation.

Returning now to the description of the normal operation of the system, it will be recalled that the current has been reversed over the trunk circuit and that the relays 404 and 905 are operated to cause the energization of the relays 409 and 307 and 900 and 801, respectively.

The circuit of the second counting relay that is completed upon the energization of the relay 306 extends from ground by way of armature 328 and its back contact, front contact and armature 336, conductor 291, conductor 164, armature 40 and its back contact, armature 48 and its back contact, armature 56 and its back contact, armature 64 and its back contact, armature 73 and its front contact, and winding of second counting relay 29 to battery. The second counting relay operates to complete a circuit for the relay 31 at armature 70, to establish a locking circuit for itself at armature 69 to be traced, to prepare a circuit for the third counting relay 28 at armature 68, and at armature 67 to open the locking circuit of the first counting relay 30, thereby permitting this relay to be deenergized.

The relay 30 is deenergized to open one point in the original energizing circuit of the relay 29, to open another point in the circuit of the switching relay 89 at armature 74, and to open another point in its locking circuit at armature 72. The relay 31 is energized and operates to establish a locking circuit for itself over a path extending from ground by way of armature 442 and its back contact, conductor 399, conductor 299, conductor 176, armature 76 and its front contact, and winding of relay 31 to battery. Another result of the operation of the relay 31 is that another point in the original energizing circuit of the relay 30 is opened at armature 75.

When the second counting relay 29 is operated, there is a circuit completed extending from ground by way of armature 340 and its back contact, conductor 292, conductor 165, armature 71 and its front contact, and winding of relay 88 to battery. The relay 88 is energized over this circuit and operates to complete the circuit of the relay 303 to be traced later at armature 141, and at armatures 142 to 146, inclusive, to prepare certain signalling circuits.

When the locking circuit of the second counting relay 29 is completed, the locking circuit is established over a path that extends from ground by way of armature 442 and its back contact, conductor 399, winding of relay 311, conductor 293, conductor 166, back contact and armature 65, armature 69 and its front contact, and winding of relay 29 to battery. As long as the original energizing circuit of the relay 29 is completed, the relay 311 is short-circuited. The circuit for the relay 303, which is completed upon the energization of the switching relay 88, extends from ground by way of front contact and armature 141, conductor 168, conductor 295, and winding of relay 303 to battery. The relay 303 operates to open the original energizing circuit of the second counting relay 29 at armature 328, at armature 329 to prepare a circuit for the relay 302 and at armature 330 to prepare a circuit for the relay 317.

When the relay 311 is energized, a circuit is established extending from ground by way of armature 362 and its back contact, front contact and armature 346, and winding of relay 314 to battery. The relay 314 operates to complete the circuit of the relay 302 at armature 353, to open one point in the trunk circuit at armature 356, and to complete a circuit extending from ground by way of armature 347 and its front contact, armature 355 and its front contact, and winding of relay 312 to battery. The relay 312 operates to prepare a locking circuit for itself at armature 348 and to open the locking circuit of the relay 313 and the circuit of the relay 403 at armature 349. When the relay 313 is deenergized, a locking circuit is established for the relay 312.

When the trunk circuit is opened, the circuit for the relays 404 and 905 is opened and these relays are deenergized. The relay 404, upon retracting its armature 425 removes the short-circuit from the winding of relay 408, thereby allowing this relay to deenergize, and at armature 426 opens the original energizing circuit of the relay 307. The relay 408 operates to open another point in the trunk circuit at armature 434. The relay 302 is energized over a previously traced circuit and operates to prepare a circuit for the relay 317.

At the substation, when the relay 905 is operated, a circuit is completed for the relay 900 at armature 930, and at armature 929 a circuit is closed extending from ground by way of front contact and said armature, conductor 871, winding of relay 801, conductor 873, and back contact and armature 943 to battery. The relay 801 operates to open the locking circuit of the relay 802 at armature 820, to complete another circuit momentarily for its winding at the front contact of this armature, to prepare a locking circuit for itself at armature 859, to open the circuit of the switching relay 512 at armature 819, and to complete a circuit for the relay 803 at the front contact of this armature.

The circuits of the relays 802 and 512 are opened by the operation of the relay 801. Relay 512 is deenergized to open the circuit of the relay 805. The relay 805 is deenergized to open the locking circuit of the relay 810 at armature 829, to open another point in the circuit of the relay 807 at armature 828, and to prepare a circuit for the third counting relay 503 at armature 827.

The deenergization of the relay 802 opens the circuit of the relay 804. The relay 804 is deenergized to open one point in the original energizing circuit of the first counting relay at armature 825, and to open the circuit of the relay 910 in the timing device. The relay 910 is deenergized to momentarily complete the circuit of the slow-releasing relay 911, which is thus maintained operated.

The relay 803, upon being energized, at armature 824 completes a circuit for the relay 910 which attracts the armature 937, again opening the circuit of the slow-releasing relay 911. Another result of the operation of the relay 803 is that a circuit is completed extending from ground by way of armature 830 and its back contact, armature 823 and its front contact, conductor 778, conductor 662, armature 556 and its back contact, armature 548 and its back contact, armature 540 and its back contact, armature 532 and its back contact, armature 525 and its front contact, and winding of relay 502 to battery. The relay 502 is operated over this circuit to complete a circuit for the relay 500 at armature 529, to complete a circuit for the relay 513 at armature 530, to establish a locking circuit for itself at armature 528, to prepare a circuit for the third counting relay 503 at armature 527, and at armature 526 to open the locking circuit of the relay 501.

The relay 501 is deenergized to open another point in the circuit of the switching relay 512 at armature 565, to open the original energizing circuit of the relay 502 at armature 525, and to open a point in its locking circuit at armature 524. The relay 500 is energized to establish a locking circuit for itself at armature 523 to ground on the grounded conductor 650, and to open another point in the original energizing circuit of the relay 501.

The relay 817, which is energized in series with the locking circuit of the relay 501, is deenergized to restore the circuits over armatures 855 and 856 to normal.

The circuit for the second switching relay 513 extends from ground by way of armature 821 and its back contact, conductor 777, conductor 661, armature 530 and its front contact, and winding of relay 513 to battery. The relay 513 is energized over the above circuit and operates to complete certain signalling circuits at armatures 573 to 577, inclusive, and at armature 572 completes a circuit extending from ground by way of its front contact and said armature, conductor 658, conductor 774, and winding of relay 806 to battery.

The locking circuit of the second counting relay 502 extends from ground on the grounded conductor 870, winding of relay 816, conductor 776, conductor 660, back contact and armature 533, front contact and armature 528, and winding of relay 502 to battery. As long as the original energizing circuit of the second counting relay 502 remains closed, the above traced circuit is ineffective. However, this original energizing circuit is opened upon the deenergization of the relay 501, and the relay 816 is energized.

The relay 806 is operated over a circuit as above traced and opens another point in the original energizing circuit of relay 502 at armature 830, at armature 831 prepares a circuit for the relay 807, and at armature 832 prepares a circuit for the relay 810. The relay 816, upon being energized in series with the second counting relay, completes a circuit extending from ground by way of armature 841 and its back contact, front contact and armature 855, and winding of relay 813 to battery. The relay 813 is operated over the above circuit and operates to complete a circuit for the relay 807 at armature 846, to open one point in the trunk circuit at armature 849, and to complete a circuit extending from ground by way of armature 856 and its front contact, armature 848 and its front contact, and winding of relay 815 to battery.

The relay 815, upon being energized, operates to open the locking circuit of the relay 814 and also the circuit of the relay 906 at armature 854, and at armature 853 to prepare a locking circuit for itself which is completed upon the deenergization of the relay 814. The relay 807, upon being operated, prepares a circuit, at armature 833 for the relay 810.

If the proper key relays associated with the second switching relay are energized by the operation of a key, such as K, a control circuit, similar to that hereinbefore traced, will be completed for operating the proper relay that is associated with the control circuit at the substation to control the apparatus unit selected by the operation of the second switching relay in the substation in the proper manner. However, if the conditions of the key relays are not changed, there will be a signalling circuit completed for sending back the position of the apparatus units selected by the operation of the second switching relay. The signalling circuits function in the same manner as has been described to prevent the operation of the impulsing chain until the operation has taken place and until an answer-back signal is obtained of the operation of the selected lamp relay or apparatus unit.

Normally, when the condition of relay 212 agrees with the condition of the apparatus unit at the remote point, relay 210 will be energized, relay 211 deenergized, and no operating signal will be sent. The stepping action, however, is maintained controlled by the substation apparatus. At each step, either harmonic relay 213 or 214 is vibrated and when sufficiently built up, opens the supervisory line at either contact 258 or 259, as the case may be, which in turn deenergizes the relay 712.

As already explained, the relay 712 was previously energized to in turn close an energizing circuit for the relay 800 and its armature opens the driving line. Now, when the relay 712 is deenergized, following the building up of the harmonic relay, the relay 800 is deenergized, permitting a further impulse to be transmitted over the driving circuit, thus causing the relay chain to be stepped over to the next relay in the chain.

These operations will be clear without further explanation, inasmuch as they have been described in connection with the operation of the first switching relay. It will suffice to say that, by the operation of the signalling circuits, the relay 800 is finally energized.

The operation of the relay 800 opens one point in the trunk circuit at armature 859 and completes a circuit for the relay 810. The relay 810 operates to establish a locking circuit for itself and to open the circuit of the relay 813. The relay 813 is deenergized to open the circuit of the relay 807 and to restore one point in the trunk circuit. The relay 807 is deenergized to open one point in the circuit of the relay 810.

When the signalling circuit is opened, signifying that the supervisory lamp relay has been operated, the alternating-current relay 712 is deenergized, as is the relay 800. The relay 800 retracts its armature 859 to establish a point in the trunk circuit. This opening of the trunk circuit by the operation of the relay 800 insures that the signalling circuits have functioned properly before the control or trunk circuit is permitted to function.

The relays 405 and 904 are now connected in series. The relay 405 operates to complete a circuit for the relay 407 and also for the relay 308, while, at the substation, the relay 904 operates to complete a circuit for the relay 902 and for the relay 802.

The operation of the relays 405 and 404 at the dispatcher's office and the relays 904 and 905 at the substation so far described are typical of their operation in controlling the remainder of the relays in the counting chain, and also the operation of the switching relays. This statement is true of the relays and functions that are dependent upon these relays. That is, to explain a little more fully, the relays 404 and 405 at the dispatcher's office are operated alternately to control respectively the operations of the relays 406 and 407 and 408 and 409. The relays 406 and 407 and 408 and 409 change the trunk circuit, that is, reverse the connections of the battery with respect to these relays at the proper time in order to secure proper functioning of the trunk or control circuit.

By the alternate operation of the relays 405 and 404, the relays 308 and 307 are alternately operated to complete circuits for the relays 305 and 306 and, in addition, to alternately remove ground from, and replace ground upon, the conductors 292 and 294 which extend to armatures, such as 71 and 74, upon successive relays in the counting relay chain. This circuit arrangement insures that, in the event the relays 307 and 308 do not operate in the proper sequence, even if through some circuit difficulty the next counting relay in the chain is energized, the switching relay associated with that counting relay will not be operated and a consequent wrong indication given to the dispatcher.

The relays 305 and 306 alternately connect ground to the conductors 289 and 291 with circuits for alternate relays in the counting chain. This circuit arrangement necessitates that the relays 305 and 306 must be operated in proper sequence in order that the counting relays will be operated in succession. Otherwise, the counting relay that is connected in circuit at that particular time will not be energized and, by the operation of the timing devices, the circuit will be restarted.

In the same manner, at the substation, by the alternate operation of the relays 904 and 905, the relays 900 to 903, inclusive, are controlled to reverse the connections of battery with respect to the trunk circuit in order to secure proper operations of the relays 904 and 905. That is, when the relay 904 is energized, it must be deenergized in order to permit the circuit to function for the reason that, even though the circuit at the dispatcher's office functions properly, ground will be applied to the trunk circuit at the dispatcher's office and neither the relay 404 nor the relay 904 will be operated.

In a like manner, the relays 801 and 802 are alternately operated to control the circuits of the switching relays 512 to 521, inclusive.

The relays 803 and 804 are so alternately operated by the relays 801 and 802 to control the circuits of the counting relays that the relays 803 and 804 must be operated in sequence in order to cause the operation of the relays in the counting chain.

In a like manner, the relays 805 and 806 are energized by the operation of alternate relays in the switching relay chain to so control the circuits of the counting relays that proper operation of the switching relays must occur before the counting relay chain is permitted to operate.

The impulsing and control circuits, as well as the signalling circuits, continue to function in the same manner as before described, the relays 28, 27, 26, 25, 24, 23, 22, 21 and 20 in the counting relay chain being energized in the sequence mentioned. The switching relays 87, 86, 85, 84, 83, 82, 81 and 80 are also operated to connect the supervisory signalling circuits and to control these signalling circuits.

At the substation, the relays 502 to 511, inclusive, are energized in the same sequence, that is, the corresponding relays in the respective chains are operated in synchronism, as are the switching relays 512 to 521, inclusive. In this manner, the proper apparatus units are controlled and supervisory signals are returned to the dispatcher in order to inform him of the condition of the apparatus units.

When the relay 20 at the dispatcher's office is operated by the energization of the relay 305, this relay operates to open the locking circuit of the relay 21, and also the circuit of the relay 311. The relay 21 is deenergized to open one point in the circuit of the switching relay 80 and to restore other circuits to normal. The relay 20, upon operating, also closes a locking circuit for itself extending from ground by way of armature 322 and its front contact, conductor 290, conductor 163, armature 33 and its front contact, and winding of relay 20 to battery.

Another result of the operation of the relay 20 is that, at armature 32, a circuit is completed extending from ground by way of front contact and said armature, conductor 162, conductor 288, and winding of relay 301 to battery. The relay 301 operates to establish a locking circuit for itself at armature 324, to open the locking circuit of the relay 300 at armature 325, and to open the circuit of the relay 315 at armature 326. The relay 300 is deenergized to open the locking circuit of the relay 20, which is deenergized, and to prepare a circuit at 320 for the relay 316. The relay 315 is deenergized to open the circuit of the relay 405, which is deenergized to permit the relay 406 to operate.

At the substation, when the relay 511 is energized, it operates to prepare a locking circuit for itself at armature 564, to open the locking circuit of the relay 510 at armature 565, and to complete a circuit at armature 563 by way of front contact and said armature, conductor 665, conductor 781, and winding of relay 808 to battery. The relay 808 is energized. Upon operating, the relay 808 establishes a locking circuit for itself at armature 834, opens one point in the locking circuit of the relay 809 at armature 835, and at armature 836 opens the circuit of the relay 812. The relay 812 is deenergized to open one point in the circuit of the relay 904 and to complete a point in the circuit for the relay 811.

When the locking circuit of the relay 510 is opened, this relay is deenergized and retracts its armatures to restore certain circuits to normal, and opens the circuit of the relay 816. The relay 816, when deenergized, retracts its armatures to restore certain circuits to normal.

The relays 316 and 811 are now energized over a circuit that extends from ground by way of armature 840 and its back contact, winding of relay 811, back contact and armature 845, armature 849 and its back contact, back contact and armature 859, conductor 381, back contact and armature 356, armature 357 and its back contact, winding of relay 316, and back contact and armature 320 to battery. The relays 316 and 811 are energized over this circuit.

The relay 316, upon being energized, opens the locking circuit of the relay 301 at armature 359, at the front contact of this armature prepares a circuit for the relay 400, at armature 360 completes a circuit for the relays 413 and 414, and at armature 361 prepares a circuit for the relay 300. The relay 301 is deenergized to prepare a locking circuit for the relay 300 and circuits for the relays 413 and 414. The relay 414, upon being energized, removes battery from the windings of the relays 307 and 308, thereby permitting the relay 308 to be deenergized. The deenergization of the relay 308 restores certain circuits to normal. The operation of the relay 413 removes ground from the ground conductor 399 at armature 442, establishes a circuit for the relay 412 at the front contact of this armature, and at armature 441 opens the locking circuit of the relay 313, which is deenergized. The relay 412 is energized to prepare a circuit at 440 for the relay 300. The removal of ground from the ground conductor 399 causes the release of the relays 408 and 409 and also the relay 31.

At the substation, the energization of the relay 811 opens the locking circuit of the relay 808 at armature 842, at the front contact of this armature prepares a circuit for the relay 909, prepares a circuit at armature 843 for the relays 914 and 915, and at armature 844 prepares a circuit for the relay 809.

The relay 914, upon being energized, removes battery from the winding of the relays 801 and 802, thereby permitting the relay 802 to be deenergized. The retraction of the armature of the relay 802 opens the circuit of the relay 804. The latter relay is deenergized to open the circuit of the timing relay 910, thus permitting this relay to be deenergized.

Another result of the operation of the relay 914 is that a circuit is prepared for the relay 916. The relay 915, upon operating, removes ground from the ground conductor 870 and completes a circuit for the relay 916. The removal of ground from the ground conductor 870 causes the release of the relay 814 and also the relay 20. The relay 814 is deenergized to restore certain circuits to normal. The removal of ground from the ground conductor 870 also causes the release of the relays 902 and 903. In the above manner, the apparatus is released when the sending operation is completed.

It will be remembered that, when the circuit breaker C operated, the relay 908 was locked in its energized position and a circuit was prepared for the relay 909. Now, when the relay 811 is energized, as previously described, a circuit is completed extending from ground by way of armature 842 and its front contact, conductor 875, armature 933 and its front contact, and winding of relay 909 to battery.

The relay 909 is energized to prepare a circuit for the relay 907 and to complete a circuit extending from ground by way of armature 935 and its front contact, conductor 883, armature 844 and its front contact, conductor 876, armature 946 and its front contact, conductor 881, and winding of relay 809 to battery. The relay 809 is energized to establish a locking circuit for itself at armature 890, to prepare a locking circuit for the relay 511 at armature 837, to complete a circuit for the relay 907 at armature 838, and to open the circuit of the relays 316 and 811 at armature 840.

The relay 907 is energized to open the locking circuit of the relay 908 which is denergized to open the circuit of the slow-to-release relay 909. The latter relay is deenergized after an interval of time to open the circuit of the relay 907 and to open one point in the circuit of the relay 809.

The equipment now starts to function in the same manner as has been before described. In this instance, supervisory signals will be sent to the dispatcher's office, to operate the signalling devices thereat to indicate the changed condition of the circuit breaker C which has been brought about by the previous action of the dispatcher and to indicate the position of all apparatus units.

If, instead of the circuit breaker being open, it had been closed and the dispatcher had desired to trip the circuit breaker, he would have operated the key K—1 in a manner to energize the relay 210, and the frequency from generator G of 66 cycles would have been transmitted through the conductor instead of the 50 cycles, as described. Since the armature of the relay 703 is designed to respond to frequencies of 66 cycles, the received currents will operate the armature of this relay only. As a result of the operation of armature 728, a circuit is completed from ground through the armature of the winding of relay 701, conductor 652, front contact and armature 568, conductor 655, through the resistor 720 and battery, to ground. This circuit shunts the winding of energized relay 705. The deenergization of the relay 705 closes an energizing circuit for the tripping coil of the circuit breaker in series with the relay 718.

In the event that an apparatus unit is operated under automatic control, in a manner well known, as for example shown in the patent to Mahoney et al. No. 1,363,666, the equipment starts to function in a somewhat similar manner. That is, the common relay 718 will be momentarily energized and will operate at armature 759 to complete a circuit extending from ground by way of said armature and its front contact, conductor 772, armature 844 and its front contact, conductor 876, armature 946 and its front contact, conductor 881, and winding of relay 809 to battery. The energization of the relay 809 starts the operation of the equipment in the same manner as described.

Now, while the equipment is functioning, if another apparatus unit should automatically operate, the relay 908 will be so locked in its energized position as to cause the operation of the relay 809 to effect the second operation of the relay chains. This provision insures that all signals of the operation of the apparatus units under dispatcher's control or automatic control will be given to the dispatcher.

The manner in which the dispatcher is enabled to control one apparatus unit has been before described. It is, of course, obvious that the dispatcher may control any number of apparatus units by operating keys and that these units will ordinarily be operated in one cycle of the relay chains. However, if the dispatcher operates a second key after he has initiated the operation of the apparatus, a circuit is completed for restarting the relay chains. This provision insures that no control signals will be omitted and is in the nature of a precautionary feature.

To describe this operation, it will be assumed that the dispatcher has thrown a key and that the equipment has started to function, and it will be assumed further that the dispatcher momentarily so operates the key K—1 as to control the circuit breaker C. The key K is a start key operated to check the condition of the apparatus units when no control operation is to be performed. As a result of this operation, a circuit is completed extending from ground by way of working contact of spring 209 and said spring, conductor 297, armature 361 and its back contact, conductor 392, and winding of relay 401 to battery. The relay 401 is energized over the above circuit and operates to prepare a circuit for the slow-releasing relay 400 at armature 421 and to establish a locking circuit for itself at armature 422.

Now, after the cycle of the relay chain has been completed, by reason of the key being operated, the relay 316 will be energized in series with the relay 811 in the manner described. By the energization of the relay 316, a circuit is completed extending from ground by way of armature 359 and its front contact, conductor 394, armature 421 and its front contact, and winding of relay 400 to battery.

The relay 400 is energized to prepare a circuit for the relay 402 at armature 420, and to complete a circuit at armature 419 extending from ground by way of front contact and said armature, conductor 386, armature 361 and its front contact, conductor 393, armature 440 and its front contact, conductor 384, and winding of relay 300 to battery. The relay 300 is energized and operates to establish a locking circuit for itself at armature 321, to prepare a locking circuit for the relay 20 at armature 322, and to complete a circuit at armature 323 extending from ground by way of said armature and its front contact, conductor 385, front contact and armature 420, and winding of relay 402 to battery. The relay 402 is energized over the above circuit and operates, at armature 423, to open the locking circuit of the relay 401, which is deenergized. When the relay 401 is deenergized, one point in the circuit of the relay 400 is opened.

Another result of the operation of the relay 300 is that, at armature 320, the circuit of the relay 316 is opened and this relay is deenergized. The deenergization of the relay 316, in addition to other results that have been described before, opens the circuit of the relay 400. The relay 400 is deenergized after an interval of time to open the circuit of the relay 402 and to open a point in the circuit of the relay 300. The apparatus will now function in the same manner as has been described.

It will be noted that the synchronous control circuit requires the current to flow alternately in opposite directions. This provision insures that the synchronous control circuit cannot operate to cause incorrect selection by reason of inductive disturbances, either electromagnetic or electrostatic.

By reason of the fact that the signalling circuits are controlled by alternating current of a predetermined frequency, these circuits will not be affected by induced disturbances, as the possibility that there will be an induced current of predetermined frequency that will flow for a sufficient time to operate the harmonic relays is very remote. By reason of the fact that the synchronous control circuit is prevented from operating after each switching relay has operated until the signalling circuits have functioned, it is insured that all control and answer-back signals will perform their proper functions.

It will be obvious that the capacity of the system may be increased in a number of ways, one of these being that relays may be added to the counting relay chains and to the switching relay chains. Another manner is that more contacts may be added to the switching relays, three contacts on each switching relay for each additional apparatus unit that it is desired to control and supervise, one of which is used for sending controlling current of two different frequencies and two being used for receiving signalling current from the remote station. It is also necessary, in the last case, to add two extra signalling conductors one for control and one for signalling between the dispatcher's office and the station or substation. Of course, by the addition of two extra signalling conductors and extra contacts on the switching relays, it is possible to increase the number of apparatus units that may be controlled by the number of switching relays in the chains.

The synchronous control circuit previously mentioned for controlling the relays in the counting chains at both the dispatcher's office and substation enable these relays to be operated in the proper sequence at a very high speed. In fact, by this control circuit, it is possible to maintain the relay chains in synchronism and operate as high as thirty per second over quite a relatively long line or trunk circuit.

My invention is not limited to the particular arrangement of the apparatus illustrated but may be variously modified without departing from the spirit and scope of my invention, as set forth in the appended claims.

I claim as my invention:

1. In an electrical control system, the combination with a first chain of counting relays, and a second chain of counting relays remotely disposed with respect to the first chain, of an impulsing circuit associated with each of said relay chains for controlling the energization of the relays in said chain in a definite sequence, a control circuit for causing the operation of said impulsing circuits, and means controlled by each relay in each chain when its circuit is completed for preventing the operation of said control circuit until each of said relays completely operates.

2. In an electrical control system, the combination with a first station, a second station, a chain of counting relays in said first station, a chain of counting relays at said second station, of an impulsing circuit associated with each of said chains for controlling the operation of the relays in said chains in a predetermined sequence, a control circuit associating the impulsing circuit in said first station with the impulsing circuit in said second station, means controlled by said control circut for initiating the simultaneous operation of said impulsing circuits, and means controlled by the operaton of a relay in the counting chain at said first station for preventing the operation of its associated impulsing circuit until the corresponding relay in the chain at said second station is operated.

3. In an electrical control system, comprising a dispatcher's office, a station, the combination with a chain of counting relays in said office, a chain of counting relays at said station, of an impulsing circuit associated with each of said chains for controlling the operation of the relays in said chains in a predetermined sequence, a control circuit associating the impulsing circuit in said office with the impulsing circuit in said station for operating said chains of relays in synchronism, means controlled by said control circuit for initiating the operation of said impulsing circuits, and means controlled by the operation of a relay in the counting chain at said station for preventing the operation of the associated impulsing circuit until the corresponding relay in the chain at said office is operated.

4. In an electrical control system, comprising a dispatcher's office, a station, the combination with a chain of relays at said office and a chain of relays corresponding in number at said station, of an impulsing circuit associated with the chain at said office for controlling the energization of the relays in said chain in a predetermined sequence, an impulsing circuit at said station for controlling the energization of the relays in the chain thereat in a predetermined sequence, a control circuit for operating said impulsing circuits in synchronism, and means controlled by the operation of any counting relay in one of said chains for preventing the operation of said control circuit until the corresponding relay in the other chain is operated.

5. In an electrical control system, comprising a dispatcher's office, a station, the combination with a chain of relays at said office and a chain of relays corresponding in number at said station, of an impulsing circuit associated with the chain at said office for controlling the energization of the relays in said chain in a predetermined sequence, an impulsing circuit at said station for controlling the energization of the relays in the chain thereat in a predetermined sequence, a control circuit for operating said impulsing circuits in synchronism, and means controlled by the operation of any counting relay in one of said chains for stopping the operation of said control circuit, and means controlled by the energization of the corresponding relay in the other chain for initiating the operation of said control circuit.

6. In an electrical control system, the combination with a first group of relays, and a second group of relays remotely disposed with respect to said first group, of means for operating the relays of said first group in a predetermined sequence, a source of current, an impulsing circuit, means including said source of current and said circuit for operating the relays in the second group in the same sequence, a second source of current, and means including said second source of current for preventing the operation of the next succeeding relay in said first group until the corresponding relay in the said second group has been operated and means including both said sources of current for operating said groups of relays in synchronism.

7. In an electrical control system, the combination with a first group of relays, a second group of relays remotely disposed with respect to said first group, of two sources of current, means including both of said sources of current for operating the relays in said of current for operating the relays in said first group in a predetermined sequence, an impulsing circuit, means for connecting said sources of current to said circuit alternately to operate the relays of said second group in the same sequence and in synchronism with said first group, and means controlled by the operation of the relays in said groups for controlling the connecting means.

8. In an electrical control system, the combination with a group of counting relays, of a group of switching relays corresponding in number to the number of said counting relays, a control circuit, a first and second source of current, a second group of counting relays operated by said control circuit, means including circuit arrangements for energizing the relays in the first counting relay group in a definite sequence, means controlled by the operation of a counting relay for causing the operation of the associated switching relay, and means controlled by the operation of said switching relays for alternately connecting said sources of current to said control circuit to operate the relays in said second group of counting relays in synchronism with said first group of counting relays.

9. In an electrical control system, the combination with a group of counting relays, of a group of switching relays corresponding in number to the number of said counting relays, a control circuit, a first and second source of current, a second group of counting relays operated by said control circuit, circuit arrangements for energizing the relays in the first counting relay group in a definite sequence, means controlled by the operation of a counting relay for causing the operation of the associated switching relay, means controlled by the operation of said switching relays for alternately connecting said sources of current to said control circuit to operate the relays in said second group of counting relays in the same sequence, and means controlled by the relays in the second counting relay group for preventing the operation of the next succeeding relay in the first counting relay group until the said relay in said second group is operated.

10. In an electrical control system, the combination with a group of counting relays, of a group of switching relays corresponding in number to the number of said counting relays, two line relays, means for operating said line relays alternately, means responsive to the alternate operation of the line relays to cause the operation of the relays of said counting chain in a definite sequence, means controlled by the operation of one of said counting relays for operating the associated switching relay, and means controlled by the operation of said switching relay for controlling said first mentioned means.

11. In a signalling system, a first station, a second station, distributors at each of said stations, each comprising a plurality of selecting points, a pair of neutral relays at each of said stations individual to groups of said selecting points, means for connecting said signalling line to one of said pairs of neutral relays at each of said stations, means responsive thereto for stepping said distributors to the succeeding point and means responsive thereto for connecting the alternate relays of said pairs to said signalling line.

12. In a signalling system, a first station, a second station, a chain of relays at said first and said second station divided into groups, a signalling line connecting said stations, a neutral relay individual to each of said groups at each of said stations, means for connecting said signalling line to one of said neutral relays at each of said stations, for energizing a relay in the individual groups and means responsive to the energization of said relay in said group for switching said signalling line to an alternate relay at each of said stations.

13. In a signalling system, a first station, a second station, a chain of relays at said first station, a chain of equivalent relays at said second station, a drive line connecting said stations, a selecting relay individual to each of said chain relays at each station, means for transmitting an impulse over said drive line, means responsive to said impulse for energizing equivalent relays of said chain at each station and for opening said drive line, means responsive to the energization of said relays in said chain at each station for energizing the associated selecting relay at each station and means responsive to the energization of the associated selecting relays at each station for reclosing said drive line.

14. In a signalling system, a first station, a second station, a chain of relays at each of said stations, each of said chains of relays being divided into a plurality of groups, an operating relay individual to each group at each station, a signalling line connecting said stations, means for associating said signalling line with an operating relay at each station, means operative following said association for transmitting an impulse over said line, said operating relay at each station being responsive to an impulse to operate an equivalent relay thereat in the group individual to said operating relay and means responsive to the energization of said relays for switching said signalling line at each station to another of said operating relays.

15. In a signalling system, a first station, a second station, a chain of relays at each of said stations, each of said chains being divided into groups, an operating relay individual to each of said groups at each of said stations, a signalling line connecting said stations, means for associating said signalling line with one of said operating relays, said operating relays being responsive to said association for opening said signalling line and for energizing equivalent relays in the chains at each station and in the group individual to said operating relays and means responsive to the energization of said relays at each station for reclosing said signalling line and for switching said line to another of said operating relays.

In testimony whereof, I have hereunto subscribed my name this 7th day of March, 1924.

THOMAS U. WHITE.